(12) United States Patent
Russell et al.

(10) Patent No.: US 6,453,602 B1
(45) Date of Patent: *Sep. 24, 2002

(54) DELAYED RELEASE BAIT CANISTER AND METHOD

(76) Inventors: Edwin Robin Russell, 5A Hiberna Rise, Sorrento, Western Australia, 6011 (AU); John Christian Servaas, Sr., Riverfront Farm, Moore River, Western Australia (AU); John Christian Servaas, Jr., 4 Prince Street, Ledge Point, Western Australia 6403 (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/446,718

(22) PCT Filed: Jun. 25, 1998

(86) PCT No.: PCT/AU98/00492
§ 371 (c)(1),
(2), (4) Date: Dec. 23, 1999

(87) PCT Pub. No.: WO99/00011
PCT Pub. Date: Jan. 7, 1999

(30) Foreign Application Priority Data

Jun. 25, 1997 (AU) .......................................... PO7561/97

(51) Int. Cl.[7] .......................... A01K 69/06; A01K 97/02
(52) U.S. Cl. .............................. 43/100; 43/44.99; 43/55
(58) Field of Search .......................... 43/44.99, 55, 100; 220/246

(56) References Cited

U.S. PATENT DOCUMENTS

| | | | | |
|---|---|---|---|---|
| 2,329,117 A | * | 9/1943 | Henderson et al. | 43/43.12 |
| 2,883,788 A | * | 4/1959 | Stitt | 43/44.99 |
| 3,176,427 A | * | 4/1965 | Hershey | 43/100 |
| 3,426,472 A | * | 2/1969 | Richard | 43/100 |
| 3,724,120 A | * | 4/1973 | Richard | 43/100 |
| 4,914,856 A | * | 4/1990 | Kennedy | 43/55 |
| 5,617,669 A | * | 4/1997 | Levey | 43/44.99 |

FOREIGN PATENT DOCUMENTS

| | | | | | |
|---|---|---|---|---|---|
| FR | 1275039 | * | 9/1960 | | 43/44.99 |
| GB | 1439585 | * | 6/1976 | | 43/44.99 |

OTHER PUBLICATIONS

The American Heritage Dictionary, Second College Edition, p. 327, 1982.*

* cited by examiner

Primary Examiner—Kurt Rowan
(74) Attorney, Agent, or Firm—John P. O'Banion

(57) ABSTRACT

This invention relates to delayed release bait canisters in which a closure member covers an opening in a body member against a bias spring and is released by a corrodible link that, when intact, secures the closure in place over the opening. In one example the canister (10, FIG. 1A) has a tubular plastic body (12) fitted with cylindrical plastic end-caps (14) and having a semi-cylindrical plastic closure (16) that fits around it to cover an opening (18) formed therein. A knob (20) is formed at the center of body (12) and a similar knob 22 is formed in the center of the closure (16) near one edge thereof. The closure (16) is biased to the open position by a loop of elastic cord (24), the ends of which are secured in the end caps (14). A corrodible link (28) with end rings (30) that fit over knobs (20) and (22) is used to hold closure (16) in its closed position over opening (18), the periphery of the closure being pulled into close contact with body (12) by the tension in cord (24).

29 Claims, 5 Drawing Sheets

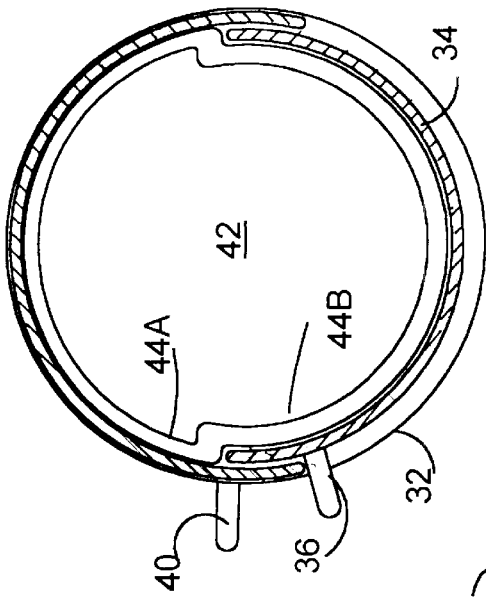
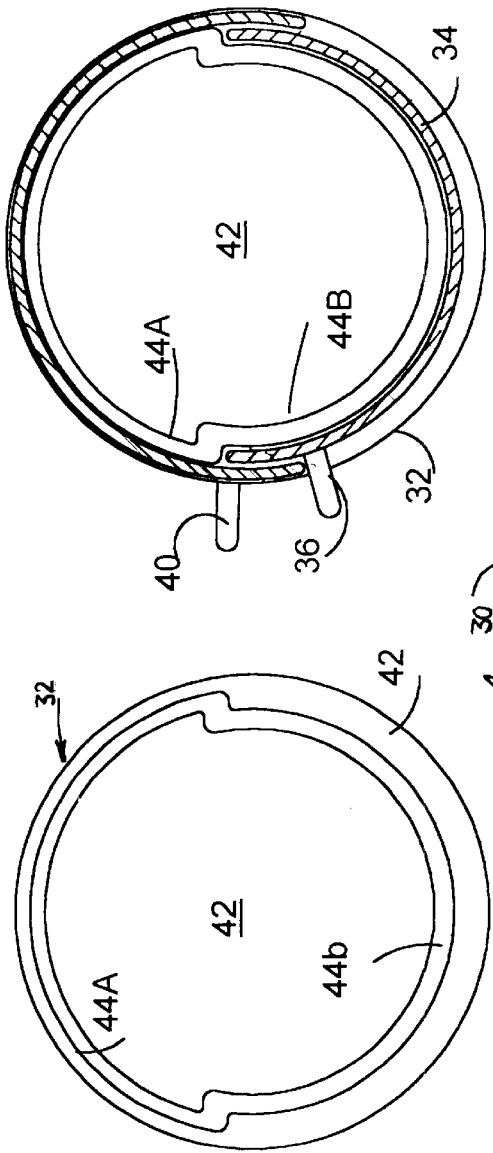
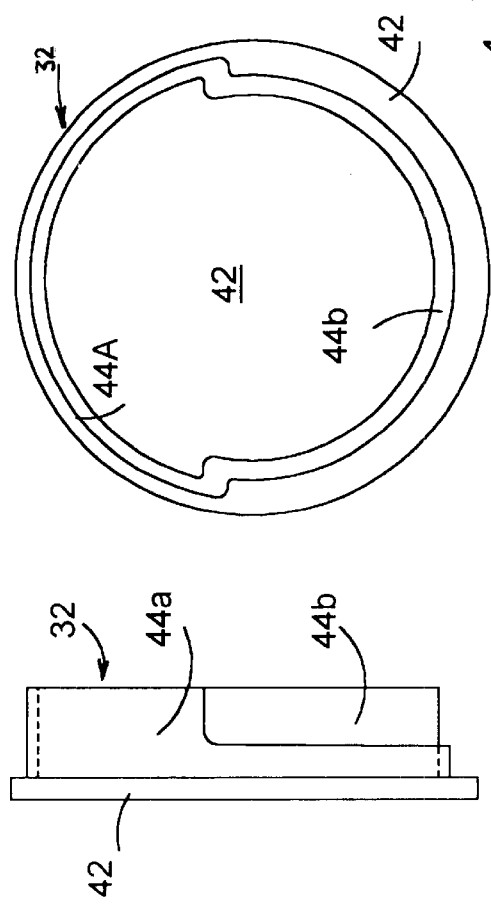
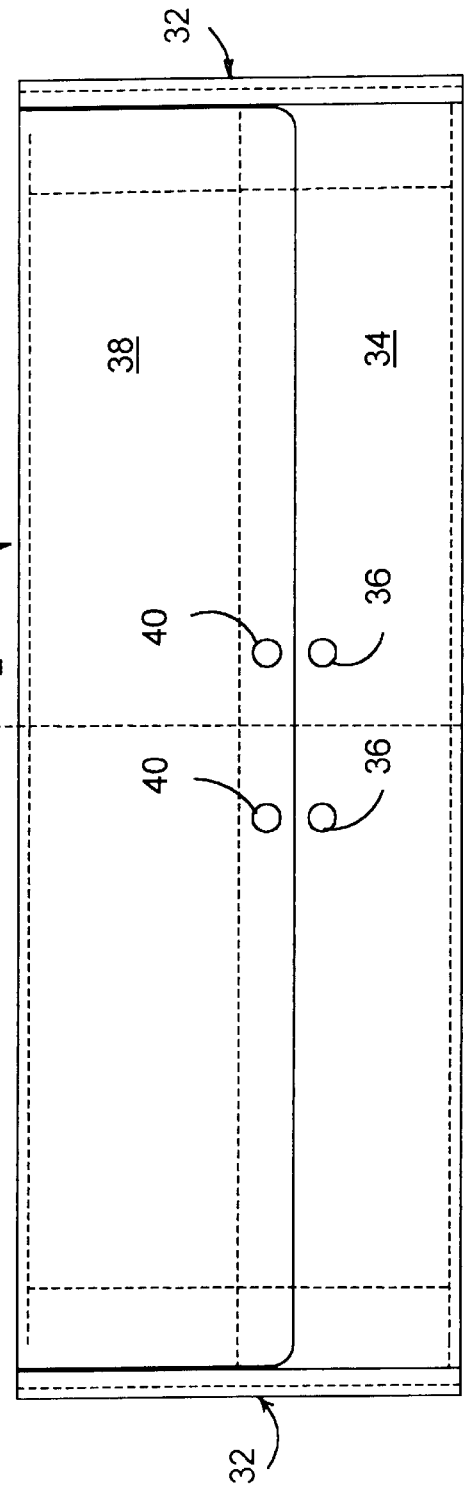

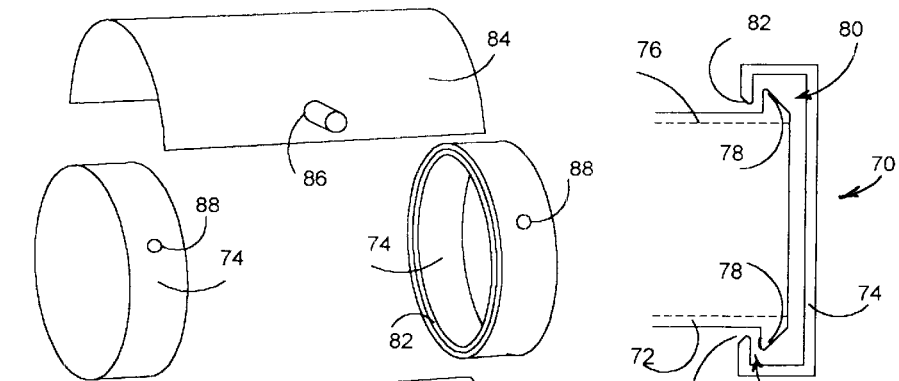
FIG. 5B
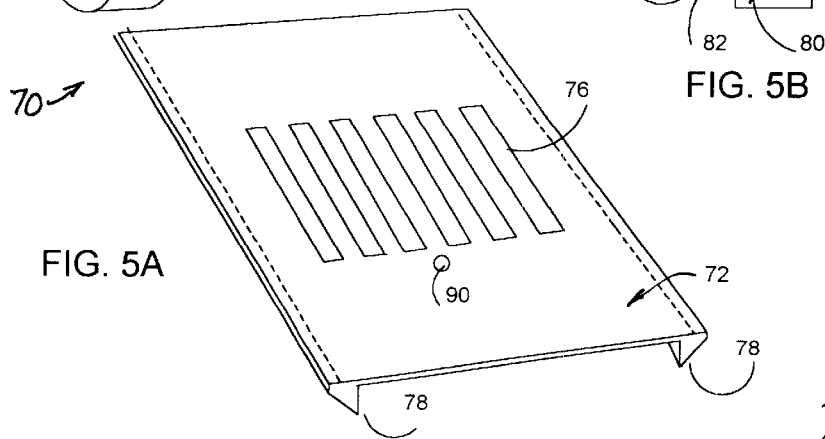
FIG. 5A
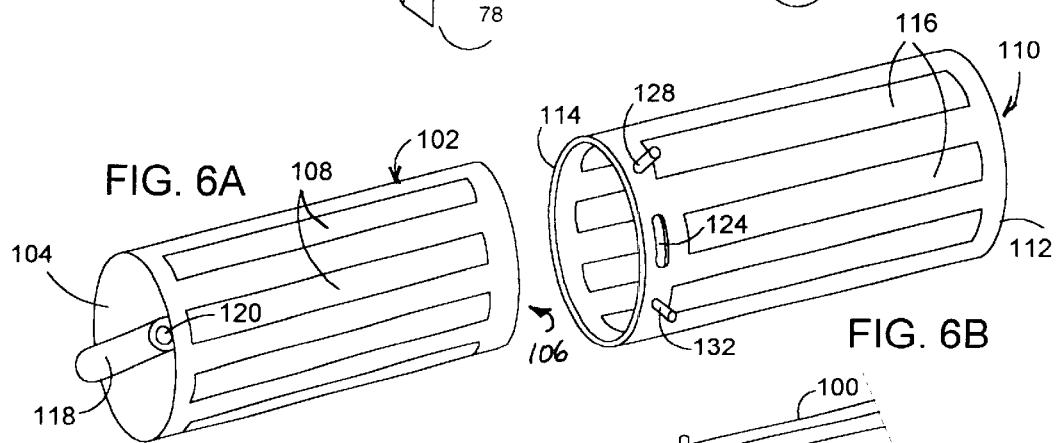
FIG. 6A
FIG. 6B
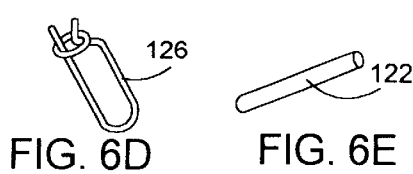
FIG. 6D   FIG. 6E
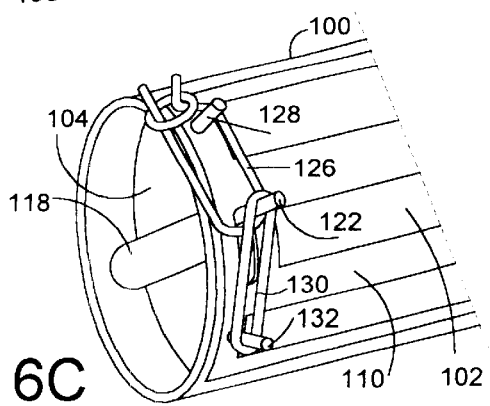
FIG. 6C

DELAYED RELEASE BAIT CANISTER AND METHOD

TECHNICAL FIELD

This invention relates to methods and apparatus for use in the baiting of fish and crustacea. It is particularly concerned with delayed release bait canisters for use with lobster, crayfish and crab pots, but the canister disclosed herein can also be used in fishing for finned fish. The invention is also concerned with delayed release devices suitable for use with such methods and canisters.

As a matter of convenience, this invention will be described with reference to cray and crab fishing using traps commonly known as pots, though it is not limited thereto.

RELEVANT PRIOR ART

The present invention is based upon the appreciation that some fishermen prefer to use large pieces of fresh bait in when trapping crays and crabs, while others prefer to employ dried or processed bait pellets which act as attractants rather than food but which tend to break-up quickly in water. Even large pieces of bait have a short life in a cray pot because they are quickly consumed or broken up by small fish, under-size crabs and crays and, particularly, by arthropods such as sea lice. Many professional cray-fishermen consider that crays are more likely to venture out to explore pots at certain times of the day or at certain tides, so they try to drop their pots accordingly but, as it may take hours to drop a line of pots, only a few can be placed on time. It would be ideal for such fishermen to have a bait canister that (i) is well-suited for use with cray and crab pots, (ii) released bait odours as soon as the pot is dropped, (iii) excluded access to the bait by sea lice, (iv), released large pieces of fresh bait within the trap at a time determined by the fishermen, and (iv), did not require cleaning out after use.

U.S. Pat. No. 4,914,856 to Kennedy et al discloses a bait container for use with crustacean traps which is formed from plastic tubing fitted with end-caps. The wall of the tubing is slotted wall to form a grill to prevent the loss of large pieces of bait, and a hinged door is provided to allow the bait to be introduced into the container. The purpose of this container is to prevent the bait from being removed by crays or crabs while allowing bait odours to escape and attract the desired crustacea, but the grill slots are large enough to allow sea lice to enter but generally too small to permit the container to be self-cleaning, and, delayed release is not possible. Russian patent 2,064,258 to Sologub discloses the use of a plastic bait container having fine perforations and removable end caps but, in this case, the perforations are tightly sealed with a rubber flap that is held in place using a corrodible link to effect timed release. The intention is apparently to delay the release of bait odours and prevent any access to the bait by crays and crabs. Not only do the applicants consider these objectives to be misguided, but such containers will be difficult and unpleasant to clean.

U.S. Pat. No. 3,654,725 to Kingston discloses the use of bait pouches containing preserved and pre-packaged bait but, here, the pouch is slit open with a draw-knife after a predetermined time. The knife is spring-loaded and is released by the use of a corrodible link. The mechanism is large and expensive and unsuited for placing in craypots. U.S. Pat. No. 3,842,529 to Richard discloses the use of a delayed-release pre-packaged bait container better suited for use in craypots. The Richard device is a can having a corrodible metal wall. Like the Kingston device, bait odours are not released into the water prior to the opening of the container. Also, since (like the Kingston device) the bait will tend to be retained in the container after opening, it may not be readily accessible by crays or crabs of the size desired and may present a cleaning and disposal problem.

U.S. Pat. No. 3,524,569 to Hershey and U.S. Pat. No. 4,563,832 to Drebot teach the use of a mesh-form bait bags to inhibit bait being carried outside of the trap and, in the case of Drebot, the mesh is so fine that it prevents access arthropods. However, the bait-bags are not convenient to seal, open and clean-out. They are also prone to being snagged and holed on the wires or canes of cray-pots, as well as becoming entangled with crustacea caught in the pot. Furthermore, like the bait containers of Kennedy and Sologub, those of Hershey and Drebot are not capable of effecting the timed release of—or access to—large particles of bait.

Delayed or controlled release of bait from containers has been practised by anglers. For example, U.S. Pat. No. 5,319,875 to Brandolino discloses the use of a bait-bag which is attached to a leader from a fishing line so that a closure on the bag can be opened to release the bait by jerking the line. French patent 1,275,039 to Chopin discloses a bait container through which the fishing line is threaded so that it can rest on a sinker near the hook. The lid of the container is held closed by a piece of bread crust or paper that disintegrates in water and, after some delay, allows the container to open. This method of timed release is unreliable and quite unsuited to crayfishing. French patent 1,488,709 to Benezet discloses a multi-compartment plastic pouch in which each compartment is sealed with a cardboard panel that disintegrates in water to effect the delayed release of bait at intervals near a fishing line. However, only pre-packaged dry bait can be used (otherwise the cardboard will disintegrate before the pouch is deployed) and such bait is not suitable for crayfish.

OBJECTIVES OF THE INVENTION

It is the general object of the present invention to provide delayed-release bait canisters or containers suitable for use with crustacean traps that do not have one or more of the disadvantages of the prior art devices mentioned above Another general objective is to provide improved corrodible links that are well adapted for use with the delayed-release canisters of the invention.

OUTLINE OF INVENTION

The reusable bait canister of the present invention has a hollow body member of sufficient capacity to accommodate pieces of fresh bait or a significant amount of attractant pellets, and an opening in the body of sufficient size to allow ready access to the bait by the target crustacea. The opening can be made up of a series of sub-openings, if desired. A closure member is supported by the body member for movement between a closed position (where it covers the opening closely enough to prevent access to the bait by small fish and sea lice but loosely enough to permit flow of water into the body member when the canister is submerged) and an open position where the opening is uncovered sufficiently to permit access to the bait by the target crays or crabs. Spring means are provided to bias the closure member to the open position, and a corrodible link is used to secure the closure in the closed position against the bias of the spring, corrodible link being adapted to corrode and break under the bias of the spring means after a predetermined time of immersion in seawater.

The opening (or series of sub-openings) can be formed in a cylindrical portion of the body so that an arcuate closure can slide circumferentially on the body to cover and uncover the opening. In that event, it is convenient to form the spring means from elastic cord secured between the body and the closure in such a way that it lies over the closure and serves to both bias the closure open and to hold it against the body. After loading the canister with bait, the closure is moved to the closed position, stretching the cord, and can be held there by fitting the corrodible link overknobs or protrusions formed on the closure and the body. A fixed time after placement in a cray pot and dropping into sea water, the link will corrode and allow the cord to open the canister. Preferably, the cord is arranged to snap the closure open against a stop so that the canister spins and all (or at least some) of the bait is discharged.

In other arrangements both the closure and the body can be tube-like, the one fitting over the other and each having openings that can be moved into or out of register to conceal the bait or to provide access to it. Again, the closure is biased to the open position but held against the bias by a corrodible link. In yet another form, the canister can be folded-up from a flat sheet so that the closure is in fact formed by the last panel to be closed, and the spring means can be formed by the resilience of the sheet material itself.

While many different corrodible links can be used, some of which are disclosed by Richard in U.S. Pat. Nos. 3,724,120 and 3,426,427, we prefer to use a loop-form link that has a springy U-shape non-sacrificial (eg, copper-plated steel) element which is held closed by a sacrificial element (eg, magnesium). Thus, in the absence of any external force, the resilience of the U-shape element will cause the sacrificial element to fracture (after a predetermined time of immersion in seawater) and result in the positive opening of the loop.

DESCRIPTION OF EXAMPLES

Having broadly portrayed the nature of the present invention, a number of examples will now be described by way of illustration only. In the following description, reference will be made to the accompanying drawings in which:

FIGS. 2A to 2D are, respectively, a side elevation of a cylindrical knock-down canister which comprises the second example of the invention, an end elevation of the inside face of an end cap-cap of the canister, a side elevation of the end-cap and an end sectional elevation of the assembled canister taken on section 1—1 of FIG. 2A.

FIGS. 5A and 5B are, respectively, a perspective and a partial sectional elevation of a knock-down version of a bait canister which comprises the fifth example of the application of the principles of the invention.

FIGS. 6A to 6E illustrate components of the sixth example of this invention; FIG. 6A being a perspective view of the inner body of the canister, FIG. 6B being a perspective of the outer closure of the canister, FIG. 6C being a partial perspective view of one end of the assembled canister, FIG. 6D being a perspective view of the corrodible link employed in this example and FIG. 6E being a perspective view of the drive-pin used in this example.

Figure 7A:
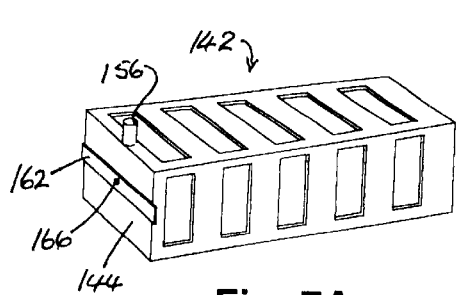
Figure 7B:
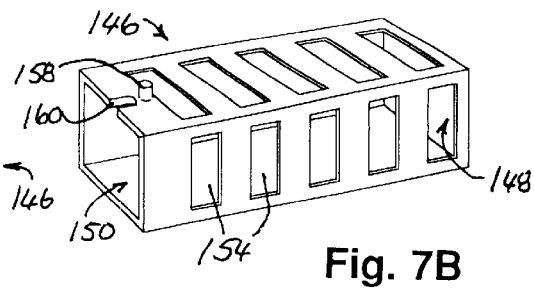
Figure 7C:
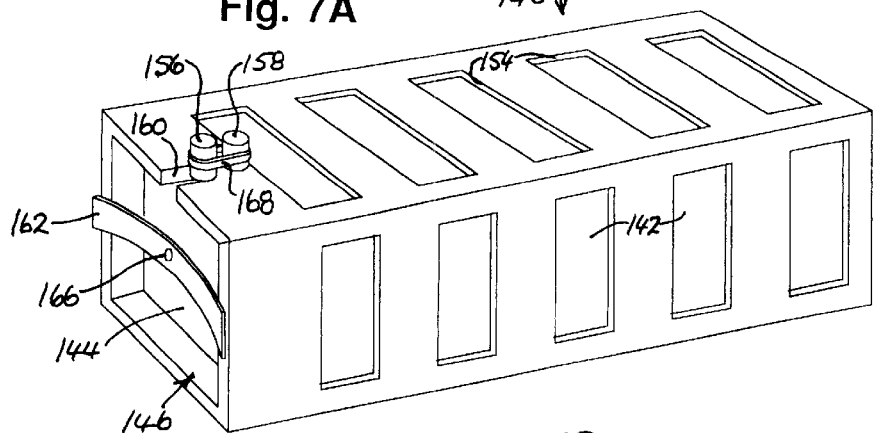

FIGS. 7A to 7C illustrate components of the seventh example of this invention; FIG. 7A being a perspective view of the inner body of the canister, FIG. 7B being a perspective of the outer closure of the canister and FIG. 7C being a perspective view the assembled canister.

Figures 8A, 8B, 8C:
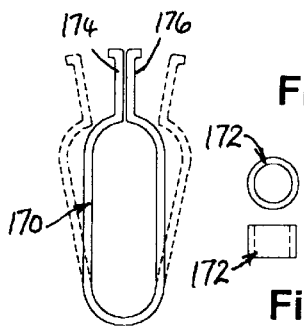

FIGS. 8A to 8C are respectively, a side elevation of the springy U-shape element of an example of a corrodible link, FIG. 8B being a plan view of a magnesium ring element of the ring, and FIG. 8C being an elevation of the ring of FIG. 8B.

Figures 9A, 9B:
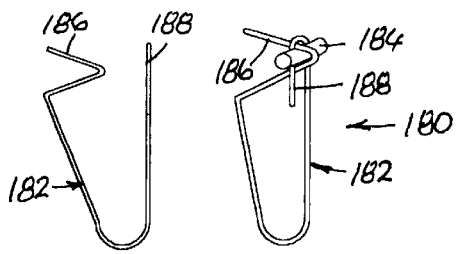

FIGS. 9A and 9B are, respectively, a side elevation of the springy element of a second example of a corrodible link and a perspective of the assembled link.

Figure 10:
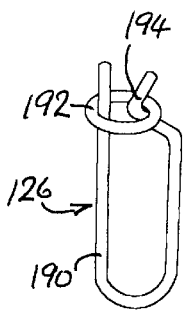

FIG. 10 is a perspective view of the third example of a corrodible link.

Figure 11:
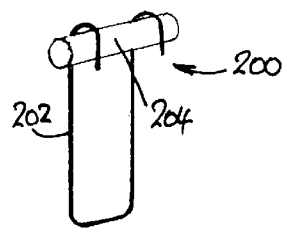

FIG. 11 is a perspective view of the fourth example of a corrodible link.

Figure 1A:
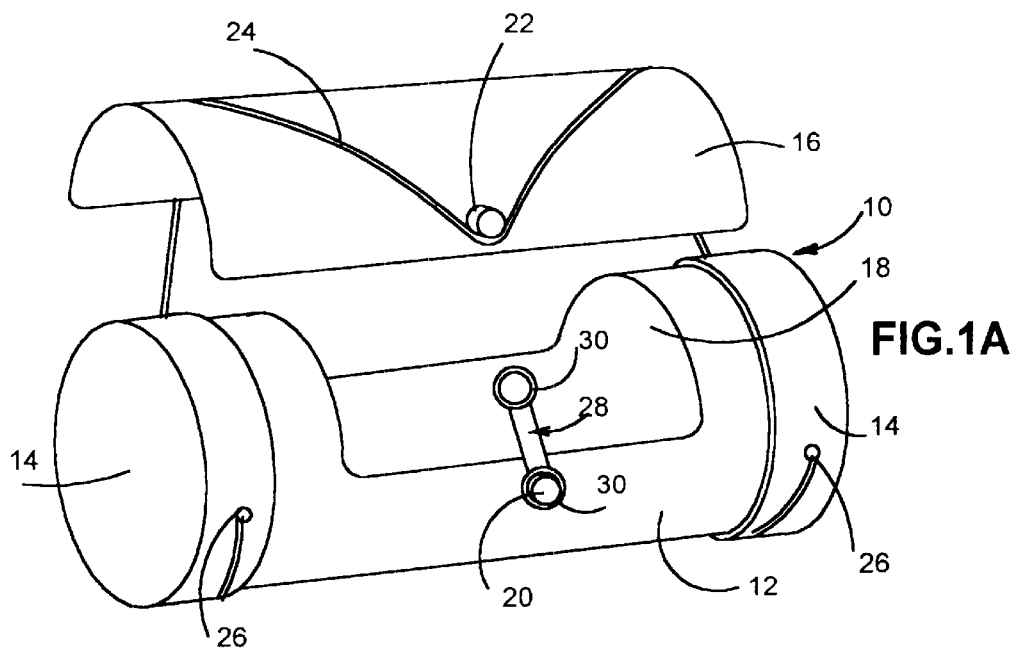
FIGS. 1A, 1B and 1C are, respectively, an exploded perspective of a cylindrical bait canister that forms the first example, a perspective of the canister when closed, and a perspective of the canister when open.
Figure 1B:
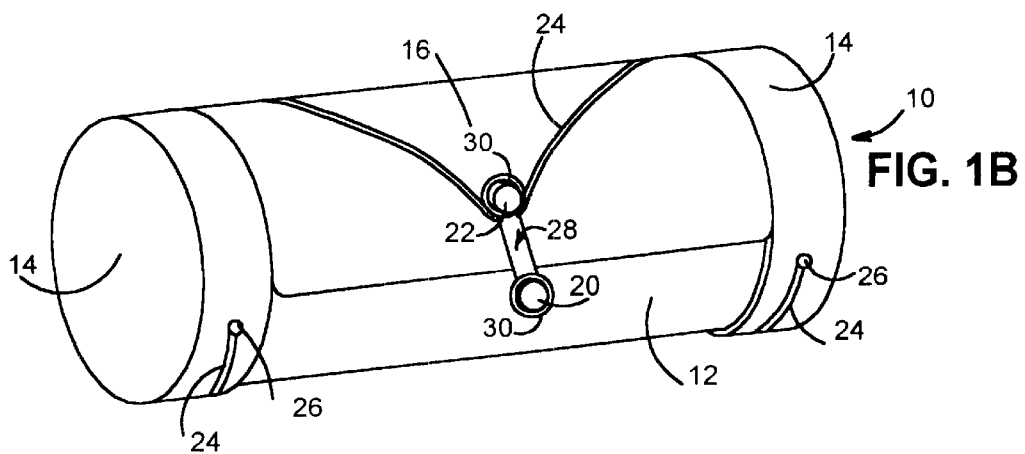
Figure 1C:
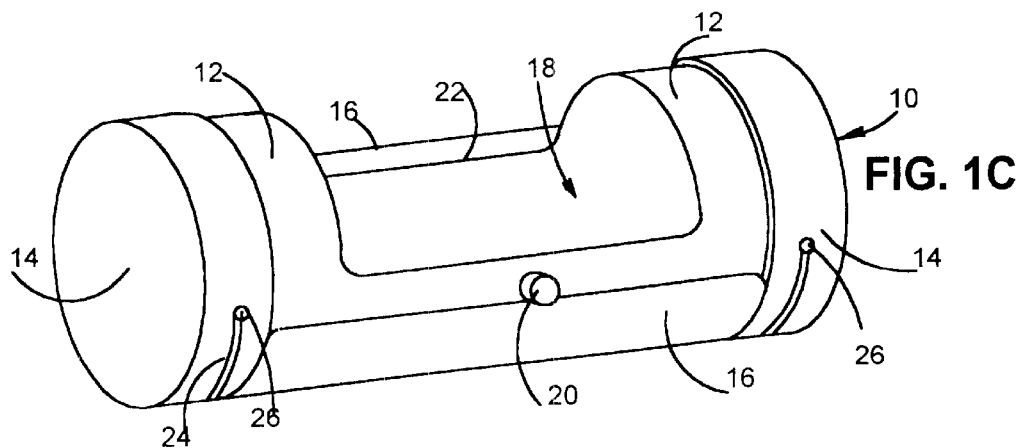

The first example, shown in FIGS. 1A, 1B and 1C, is a bait canister 10 having a tubular plastic body 12 fitted with cylindrical plastic end-caps 14 and having a semi-cylindrical plastic closure 16 that fits around the body and is axially located by the end-caps. Preferably, when viewed in profile, cover 16 extends for somewhat more than 180° so that it clips onto and around body 12. A large single opening 18 is formed in the top portion of body 12 through which bait can be loaded into the body. A knob or protrusion 20 is formed at the centre of body 12 near one side of opening 18 and a similar knob or protrusion 22 is formed in the centre of closure 16 near one edge thereof.

When closure 16 is fitted in place over opening 18 on body 12, its knob 22 will lie opposite—or juxtaposed to—but a little spaced from knob 20 on body 12. Normally, closure 16 will be biased to the open position shown in FIG. 1C by a loop of elastic cord (often called shock-cord) 24, the ends of which are secured in holes 26 formed in end caps 14. A corrodible link 28 with end rings 30 that fit over knobs 20 and 22 is used to hold closure 16 in its closed position over opening 18, the periphery of the closure being pulled into close contact with body 12 by the tension in cord 24.

The link 28 forms both a lock means which holds the canister closed and a timer which effects the release and opening of the canister after a time delay. It is conveniently made from dissimilar metals which rapidly corrode and break by galvanic action after a specified time when placed in seawater. As already noted, similar links are disclosed by the Richard references given above.

The manner of use of the canister of the first example will be obvious. It is assembled (except for link 28) and stored in the open position (FIG. 1C). When needed for use, it is filled with pieces of fresh bait or dried attractant as preferred, the closure 16 is moved to the closed position and link 28 is fitted onto knobs 20 and 22 to hold it closed. The canister is then loaded into a cray-pot and the pot is dropped into place. After the desired time has elapsed, link 28 will corrode through and the closure 18 of canister 10 will be snapped open by the action of cord 24. Preferably, with fresh bait, the opening force provided by cord 24 is large enough to ensure that closure 16 will be rapidly rotated about body 12 until it strikes and stops at body-knob 20. This impact will spin the canister in the water, throwing out the bait into the cray-pot.

The canister 30 of the second example, shown in FIGS. 2A to 2D, is essentially the same as that of the first example, except that it is made in a knock-down form so that it can be carried and stored more compactly. It consists of moulded plastic cylindrical end-caps 32, a separate semi-cylindrical body 34 fitted with an integral or separate knobs 36 and also formed of plastic material, and a similar semi-cylindrical closure 38 with its knobs 40. The manner in which body 34 fits into end-caps 32 will be clear from FIGS. 2B and 2D. The end-caps 32 consist of an end-flange 42 and an integrally-moulded short tubular protrusion 44 the upper half 44a of which is of a larger diameter than the lower half 44b. The ends of the body 34 are snap-engaged onto the lower half 44b of the end-caps 32 so that the upper half 44a and the outside of body 34 form a smooth external periphery around which the closure 38 can slide open and closed as in the first example.

Figure 3A:
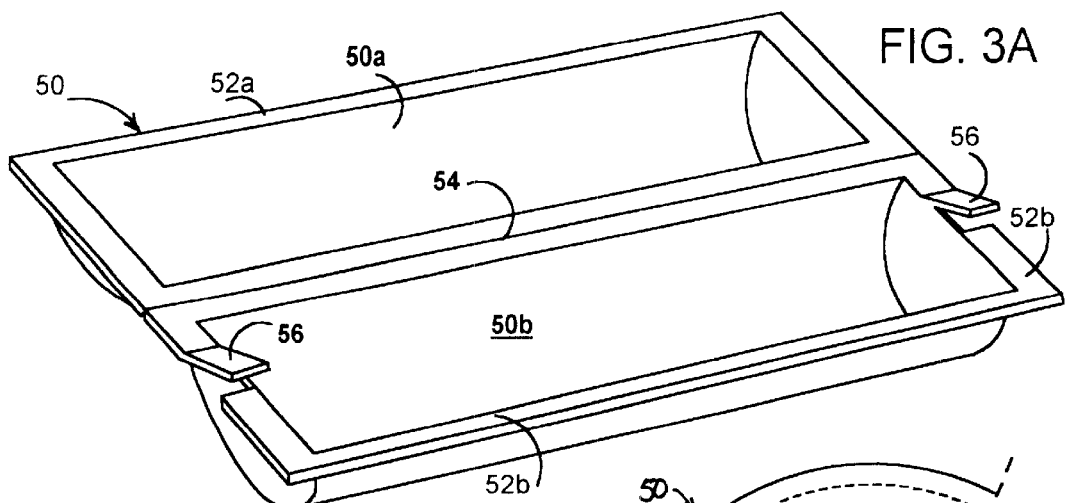
FIGS. 3A to 3C are, respectively, a perspective view of the open canister of which comprises the third example of the invention, a an end view of the canister when closed and an enlarged partial end view of the canister when partly open.
Figure 3B:
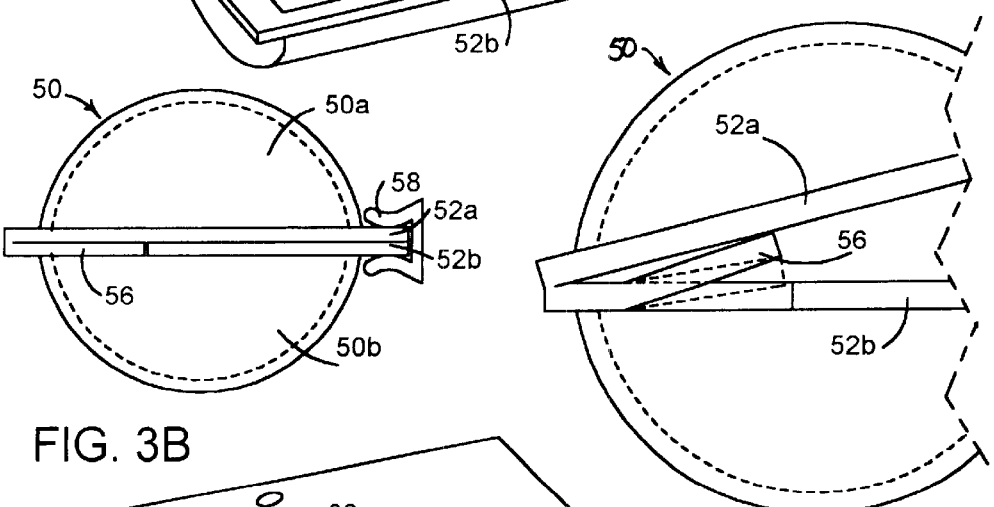
Figure 3C:
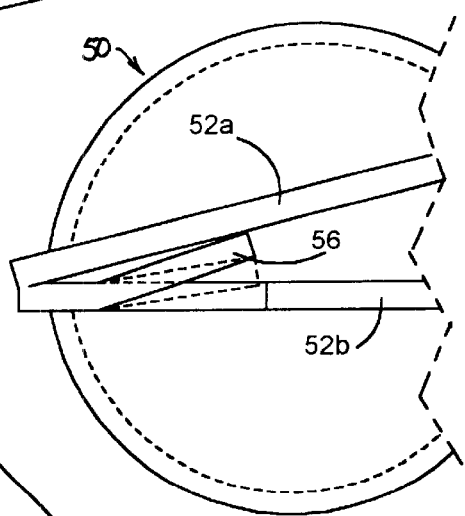

The third example, shown in FIGS. 3A and 3B, comprises a one-piece canister 50 which has two substantially identical semi-cylindrical halves 50a and 50b, moulded from a plastic material such as polypropylene, that have peripheral flanges 52a and 52b (respectively) and are joined together by an integral hinge 54. Canister half 50a forms the closure member while half 50b forms the body member. The construction enables the open canisters to be stacked in a compact manner. Near hinge 54 on each flange 52 a stiff but deformable tag 56 is raised to serve as a leaf spring which biases the two halves of canister 50 open. In this example, canister 50 is held closed by a bimetallic corrodible clip 58 which engages flanges 52a and 52b, Clip 58 can be readily applied by a dispenser gun like that commonly used for stationary clips.

Figure 4A:
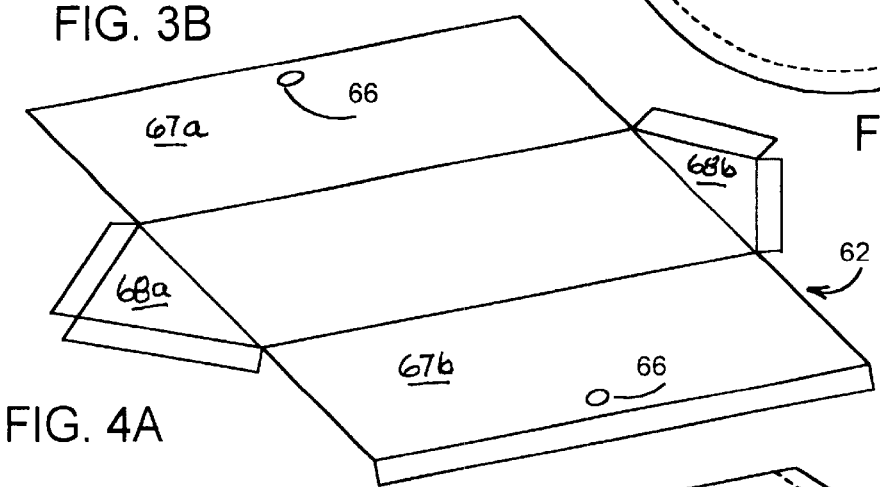
FIGS. 4A and 4B are perspective views of a foldable canister which forms the fourth example of the invention, FIG. 4A showing the shape of the flat sheet from which the folded canister of FIG. 4B is formed.
Figure 4B:
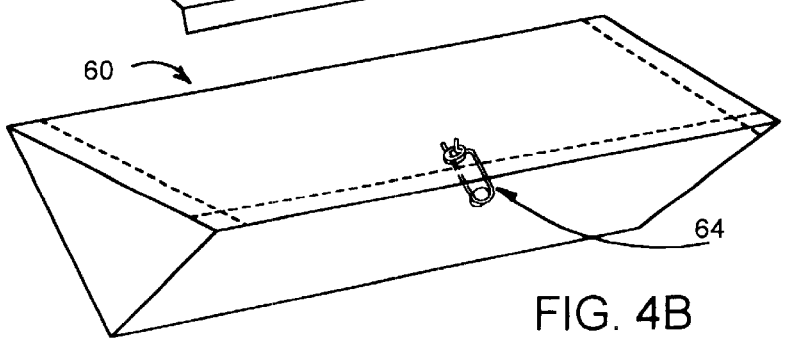

The fourth example, shown in FIGS. 4A and 4B, is a canister 60 shaped like a column of triangular section and folded from a suitably cut sheet 62 of polypropylene or other suitable plastic capable of forming integral hinges between the panels. In this case, a bent and hooked GTR link 64 is provided to engage holes 66 in panel 62 to hold the panel closed around a bait. No external spring means is illustrate in this example because the natural resilience of the material of sheet 62 will be sufficient to open the canister once link 64 has broken. The closure member is effectively formed by the last panel to be closed, whether it be either side panel 67a or 67b or either end panel 68a or 68b.

The fifth example, shown in FIGS. 5A and 5B, is a cylindrical canister 70 (shown disassembled in FIG. 5A) having a flexible body sheet 72 which is rolled up and fitted into a pair of end-caps 74 to enclose the bait (not shown). The sheet 72 has a grilled opening 76 formed therein designed to retain the larger portions of bait and a pair of ribs 78 formed on opposed edges of its outer face which engage a groove 80 behind an inner peripheral lip 82 formed on each end-cap 74 so that the end caps are retained on the rolled sheet 27 when it is pushed home. A sliding closure member 84 of the type disclosed in the first example is used to cover the opening 76 in the same manner as in the first example, a knob 86 being formed in the centre of the closure for engagement with the loop of a shock-cord (not shown) which has its ends anchored in holes 88. As in the first example, a knob 90 is secured in the centre of sheet 72 near the edge of window 76 (only the bottom of knob 90 being indicated as most of it will protrude from the outer face of sheet 72.

The sixth example of the application of this invention is shown in FIGS. 6A to 6E. It comprises a canister 100 (shown assembled in FIG. 6C) comprising an inner body tube 102 having a closed end 104 and an open end 106 into which the bait can be loaded. The opening of this example is formed by a series of longitudinal or axial slots 108 formed around the cylindrical wall of body 102. The closure is formed by outer tube 110 having a closed end 112, an open end 114 and slots 116 formed around its cylindrical wall. A tube 118 is formed diametrically across closed end 104 of body 102 and has an inner bore 120 in which a pin 122 (FIG. 6E) is a snug fit.

To assemble canister 100, the bait is placed in body tube 102 from open end 106 and the body is placed inside closure tube 110 so that hole 120 in tube 118 is aligned with a slot 124 formed in tube 110. Pin 122 is then pushed through slot 124 and into tube 118 to lock body 102 and closure 110 axially together while allowing limited relative rotational movement. A corrodible link is place over the protruding portion of central pin 122 and over a first stud 128 protruding from outer tube or closure 110. In this position, the slots 108 of body 102 are not aligned with slots 116 of closure 110 so that there is no access to the bait within the closed canister. An elastic band 130 is looped around central pin 122 and around a second stud 132 which protrudes from the end of closure 110.

When canister 100 is placed in sea water, link 126 will corrode and break, enabling elastic band 130 to pull central pin 122 toward it, thereby rotating the body 102 relative to closure 110 so that their respective slots 108 and 116 are aligned and the bait within is exposed.

The seventh example, illustrated in FIGS. 7A to 7C, is based upon a similar principal to that of the sixth example, except that the canister 140 (shown assembled in FIG. 7c) is of rectangular section and rectilinear form. Canister 140 comprises an inner tubular body member 142 having a closed end 144 and an open end 146, while outer tubular closure member 146 has closed end 148 and open end 150. A series of slots 152 in each side of the body form the opening together with an identical (but axially displaced) series of slots 154 in each wall of closure member 146. A short stub 156 protrudes outwardly from near the closed end 144 of body 142 and a corresponding stub 158 protrudes outwardly from the open end of closure member 146. A short axially-extending slot 160 is formed in the side wall of open end 150 of closure 146 near stub 158 to accommodate stub 156 of body member 142 when the body and closure of the canister are assembled (see FIG. 7C).

In this example, the spring means comprises a stainless steel leaf spring 162 secured by a central rivet 166 to closed end 144 of body 142 so that, when the body tube 142 is pushed home in the closure tube 146, spring 162 is deflected. In this position slots 152 do not register with slots 154 so that access to bait within body 142 is denied to sea lice, fish, crabs and crays alike. To retain the body and closure in this position, a ring-like corrodible link 168 is passed over studs 156 and 158. When this canister is placed in seawater, link 168 will gradually corrode and, when it breaks, spring means 162 will straighten thereby moving body tube 142 outwards relative to closure tube 146 so that slots 152 and 154 are aligned and access to the bait in canister 140 is enabled.

As already noted, it is possible to use a wide variety of corrodible links with the canisters of this invention, but links which have been found to be particularly suitable are those where the non-sacrificial element serves as a hairpin spring that assists in breaking the sacrificial element and springs open to clear the moving parts of the canister. As noted above, it is convenient to form the spring elements from copper coated steel wire and to form the sacrificial elements from magnesium metal or alloy. Examples of these links are illustrated in FIGS. 8 to 11. In FIG. 8A, one form of hairpin spring 170 is illustrated, the closed or tensioned position being shown in solid lines and the relaxed position being shown in broken lines. In this case, the sacrificial element comprises a small magnesium ring 172 (FIGS. 8B and 8C) and the link is simply assembled by pressing free ends of 174 and 176 of element 170 together while ring 172 is dropped thereover. The tips of ends 174 and 176 are bent outwardly to ensure that ring 172 is not accidentally dislodged.

In the example of FIGS. 9A and 9B, the link 180 is formed from hair-spring element 182 and a short length of magnesium rod 184. The free ends of element 182 are bent into two hooks which are disposed at right angles to one another so that, when sprung together, they will interleave to allow rod 184 to be inserted and hold the spring closed or tensioned. Again, corrosion of rod 184 in sea water will release spring element 182 and allow the associated canister to open cleanly.

The example of FIG. 10 is an enlarged representation of the link 126 of the sixth example of a canister (see FIG. 6C). This example is an asymmetric form of the example of FIGS. 8A to 8C, having an asymmetric hairpin element 190 and a ring-like sacrificial element 192 that is retained in place by a kink or bend 194 formed in one end of the hairpin element.

In the final example, shown in FIG. 11, a link 200 is formed by crimping the ends of a hairpin element 202 around a short length of magnesium rod 204. Again, care is taken to form element 202 so that its ends spring apart when rod 204 corrodes through.

It will be appreciated that the examples which provide for the rotary opening of a canister are less likely to foul on the walls of a bait cage than those which unfold, but the latter examples have application where space within the cray-pot is not too restricted. It will also be appreciated that larger cray-pots will have the capacity to house two or more canisters and that each may be set to open at a different time to provide two or more surges of bait. But, whether with single or multiple canisters, delayed opening has been found to be much more effective in attracting and trapping crayfish than merely placing the bait in the pot or in a bait cage within the pot.

While the above described examples have clearly met the objectives and advantages of the invention as set out above, those skilled in the art will appreciate that there many alterations and additions can be made without departing from the scope of the invention as defined by the following claims.

What is claimed is:

1. A reusable bait canister suitable for use in cray or crab traps, comprising:
   a hollow body member of sufficient capacity to accommodate pieces of fresh bait, said body member being elongate and having a side portion of cylindrical shape,
   an opening formed in the body member, which opening is of sufficient size to permit access to the bait by target crays or crabs,
   a closure member supported by the body member for movement moveable between a closed position, in which the closure covers the opening closely enough to prevent access to the bait by small fish and sea lice but loosely enough to permit flow of water into the body member when the canister is submerged, and an open position in which the opening is uncovered sufficiently to permit access to the bait by the target crays or crabs,
   guide means provided to locate the closure member axially relative to the body member during arcuate sliding movement of the closure member between the open and closed positions;
   said guide means comprising first and second ends of the body member between which ends the side portion is located;
   said first and second ends are radially enlarged with respect to the side portion so as to be adapted to guide the closure member axially during said arcuate movement between said closed position and said open position,
   spring means operative between the body member and the closure member effective to bias the closure member to the open position, and
   corrodible link means adapted for connection between the body member and the closure member to secure the closure member in the closed position against the bias of the spring means, said corrodible link means being adapted to corrode and break under the bias of the spring means after a predetermined time of immersion in seawater.

2. A bait canister according to claim 1 wherein:
   the side portion has an external radius,
   said opening is formed in said side portion and is of elongate shape and of sufficient size to permit pieces of fresh bait to be readily placed within the body member,
   said closure member is elongate and of arcuate section with an internal radius that approximates the external radius of said side portion, and
   the closure member is arranged to slide arcuately over the side portion of the body to fully cover and uncover the opening in the body.

3. A bait canister according to claim 1 wherein:
   the body member is tubular and the side portion has an external radius,
   an end cap is provided at each end of the body member, at least one of the end caps being removable to allow bait to be placed within the body member,
   said opening is formed in said side portion of the body member and comprises a plurality of spaced sub-openings, at least one of which is of sufficient size to permit access to the bait by target crays or crabs,
   said closure member is elongate and of arcuate section with an internal radius that approximates the external radius of said side portion, and the closure member is arranged to slide arcuately on the side portion of the body to fully cover and uncover said sub-openings.

4. A bait canister according to claim 3 wherein said spring bias means comprises a resiliently extensible cord connected between the body member and the closure member so as to at least partially wrap over the closure member so as to resiliently hold the closure member against said side portion of the body member when the closure member is in the closed position and when the closure member is in the open position.

5. A bait canister according to claim 4 wherein:
   a first protrusion is formed on the closure member near one edge thereof and a second protrusion is formed on the body member near the opening so that the two protrusions are adjacent when the closure member is in the closed position,
   said cord is attached at each end to the body and is passed around said first protrusion to bias the closure member to the open position relative to the body member, and
   said corrodible link is adapted to extend between and connect said protrusions to hold the closure member in the closed position against the bias of the cord.

6. A bait canister according to claim 1 having stop means operative between the closure member and the body member to determine the opening position of the closure member, the arrangement of the spring bias means and the stop means being such that, when the closure member is released from the closed position by the fracture of the corrodible link, the closure member will be drawn forcibly against the stop means by the spring bias means to cause the canister to rotate about its longitudinal axis and to discharge bait therefrom.

7. A bait canister according to claim 1 wherein:

said closure member and said body member are elongate in form and are hingedly connected together about an elongate joint such that the closure member forms a lid for the body member;

a first peripheral lip is formed around the body member and a second peripheral lip is formed around the closure member such that, when the closure member is in the closed position, the first and second peripheral lips are juxtaposed;

said spring means comprises at least one leaf-spring formed integrally with one of the said peripheral lips so as to bias the closure member and the body member apart; and said link means comprises at least one metallic clip adapted to fit over portion of the juxtaposed peripheral lips and to hold them together against the bias of the leaf spring.

8. A bait canister according to claim 1 wherein:

the body member is tubular, has a given cross-sectional shape and has a side wall, the side wall of the body member has a first series of openings formed therein, the openings being of uniform size and spacing, the closure member is tubular, has said given cross-sectional shape and has a side wall, the side wall of the closure member has a second series of openings formed therein, the openings of the second series being of substantially the same size and shape as the openings of said first series, and the body member is slidingly and/or rotationally located within the closure member so that said first and said second series of openings can be brought into registry to allow access by target crabs or crays to bait located within the body member through said openings, and so that said first and second series can be moved out of registry to prevent access of sea lice or the like, and of the target crays or crabs, to bait located within the body member.

9. A bait canister according to claim 8 wherein:

said given cross-sectional shape is a circle so that both the body member and the closure member are of cylindrical form, and so that, when the body member is located within the closure member, they have a common longitudinal axis, the openings of the first series and the openings of the second series extend axially along the body member and along the closure member, respectively, and the openings of the first and second series can be moved into and out of registry by rotation of the closure member relative to the body member about said common longitudinal axis.

10. A bait canister according to claim 9 wherein:

said spring means is arranged to rotationally bias the body member and the closure member relative to one another so as to tend to bring the openings of the first series into registry with the openings of the second series, and said corrodible link is arranged to rotationally retain the body member and the closure member against the bias of said spring means so that the openings of the first series are held out of registry with the openings of the second series and access of sea lice and of the target crays or crabs to bait held within the canister is prevented so long as said corrodible link remains intact.

11. A bait canister according to claim 8 wherein:

said given cross-sectional shape is a rectangle so that both the body member and the closure member are of rectalinear form, and so that, when the body member is located within the closure member, they have a common longitudinal axis, the openings of the first series and the openings of the second series extend laterally along at least one side of the body member and laterally along the corresponding side or sides of the closure member, respectively, and the openings of the first and second series can be moved into and out of registry by longitudinal movement of the closure member relative to the body member along said common longitudinal axis.

12. A bait canister according to claim 11 wherein:

said spring means is arranged to longitudinally bias the body member and the closure member relative to one another so as to tend to bring the openings of the first series into registry with the openings of the second series, and said corrodible link is arranged to retain the body member and the closure member against the bias of said spring means so that the openings of the first series are held out of registry with the openings of the second series and access of sea lice and of the target crays or crabs to bait held within the canister is prevented so long as said corrodible link remains intact.

13. A bait canister according to claim 5, wherein the corrodible link means comprises a loop adapted to encircle said protrusions, said loop comprising a first metallic element and a second metallic element assembled to form said loop, said second metallic element being formed from a metal that is electrochemically dissimilar to said first element and adapted to sacrificially corrode in sea water with respect to the metal of said first element, so that, when the link is placed in seawater and when sufficient corrosion of the second element has taken place, said loop will open.

14. A bait canister according to claim 1, wherein said corrodible link comprises:

a first metallic element comprising a U-shape spring of ferrous metal wire formed so that its ends are spaced from one another by a distance when unstressed; and a second metallic element formed from a metal that is electrochemically dissimilar to said first element and adapted to sacrificially corrode in sea water with respect to the metal of said first element;

wherein said first and second elements are secured together so as to form a closed loop in which said second element is employed to hold the ends of said U-shape spring together by less than said distance against a force exerted by said U-shape spring, whereby, when the link is placed in seawater and when sufficient corrosion of the second element has taken place, said force exerted by the U-shape spring will fracture the second element and enable outward movement of the ends of the U-shape spring, thereby opening said loop.

15. A bait canister as recited in claim 1, wherein said corrodible link means includes a corrodible release means that when sufficiently corroded releases said connection been said canister and said closure.

16. A bait canister as recited in claim 15, wherein said release means comprises a first corrodible metal portion.

17. A bait canister as recited in claim 16, wherein said corrodible link means comprises a second corrodible metal portion, said first and second corrodible metal portions being formed of dissimilar metals, and wherein said first corrodible metal portion is susceptible to galvanic corrosion upon immersion in seawater.

18. A bait canister as recited in claim 17, wherein said first and second metals are chosen according to the length of predetermined time required.

19. A reusable bait canister suitable for use in cray or crab traps, comprising:
   (a) a hollow body member of sufficient capacity to accommodate pieces of fresh bait, said body member being tubular and elongate, said body member having a side portion of cylindrical shape, said side portion having an external radius;
   (b) an opening formed by the body member, said opening being of sufficient size to permit access to the bait by target crays or crabs, said opening being formed in said side portion of the body member and comprising a plurality of spaced sub-openings, at least one of said sub-openings being of sufficient size to permit access to the bait by target crays or crabs;
   (c) a closure member supported by the body member for movement moveable between a closed position wherein the closure covers the opening closely enough to prevent access to the bait by small fish and sea lice but loosely enough to permit flow of water into the body member when the canister is submerged, and an open position wherein the opening is uncovered sufficiently to permit access to the bait by the target crays or crabs, wherein the closure member is elongate and of arcuate section with an internal radius that approximates the external radius of said side portion, and wherein the closure member is arranged to slide arcuately on the side portion of the body to fully cover and uncover said sub-openings;
   (d) spring means operative between the body member and the closure member effective to bias the closure member to the open position; and
   (e) corrodible link means adapted to secure the closure member in the closed position against the bias of the spring means, said corrodible link means being adapted to corrode and break under the bias of the spring means after a predetermined time of immersion in seawater;
   (f) an end cap at each end of the body member, at least one of the end caps being removable to allow bait to be placed within the body member.

20. A bait canister as recited in claim 19, wherein said spring bias means comprises a resiliently extensible cord connected between the body member and the closure member so as to at least partially wrap over the closure member so as to resiliently hold the closure member against said side portion of the body member when the closure member is in the closed position and when the closure member is in the open position.

21. A bait canister as recited in claim 20,
   wherein a first protrusion is formed on the external surface of the closure member near one edge thereof and a second protrusion is formed on the external surface of the body member near the opening so that the two protrusions are adjacent when the closure member is in the closed position;
   wherein said cord is attached at each end to the body and is passed around said first protrusion to bias the closure member to the open position relative to the body member; and
   wherein said corrodible link means is adapted to extend between and connect said protrusions to hold the closure member in the closed position against the bias of the cord.

22. A reusable bait canister suitable for use in cray or crab traps, comprising:
   (a) a hollow body member of sufficient capacity to accommodate pieces of fresh bait;
   (b) an opening formed by the body member, which opening is of sufficient size to permit access to the bait by target crays or crabs;
   (c) a closure member supported by the body member for movement between a closed position wherein the closure covers the opening closely enough to prevent access to the bait by small fish and sea lice but loosely enough to permit flow of water into the body member when the canister is submerged, and an open position wherein the opening is uncovered sufficiently to permit access to the bait by the target crays or crabs;
   (d) spring means operative between the body member and the closure member effective to bias the closure member to the open position;
   (e) corrodible link means adapted to secure the closure member in the closed position against the bias of the spring means, said corrodible link means being adapted to corrode and break under the bias of the spring means after a predetermined time of immersion in seawater; and
   (f) stop means operative between the closure member and the body member to determine the opening position of the closure member, the arrangement of the bias means and the stop means being such that, when the closure member is released from the closed position by the fracture of the corrodible link means, the closure member will be drawn forcible against the stop means by the bias means to cause the canister to rotate about its longitudinal axis and to discharge bait therefrom.

23. A reusable bait canister suitable for use in cray or crab traps, comprising:
   (a) a hollow body member of sufficient capacity to accommodate pieces of fresh bait;
   (b) an opening formed by the body member, said opening being of sufficient size to permit access to the bait by target crays or crabs;
   (c) a closure member supported by the body member for movement between a closed position wherein the closure covers the opening closely enough to prevent access to the bait by small fish and sea lice but loosely enough to permit flow of water into the body member when the canister is submerged, and an open position wherein the opening is uncovered sufficiently to permit access to the bait by the target crays or crabs;
   (d) wherein said closure member and said body member are elongate in form and are hingedly connected together about an elongate joint such that the closure member forms a lid for the body member;
   (e) wherein a first peripheral lip is formed around the body member and a second peripheral lip is formed around the closure member such that, when the closure member is in the closed position, the first and second peripheral lips are juxtaposed;

(f) spring means operative between the body member and the closure member effective to bias the closure member to the open position, wherein said spring means comprises at least one leaf-spring formed integrally with one of said peripheral lips so as to bias the closure member and the body member apart; and (g) corrodible link means adapted to secure the closure member in the closed position against the bias of the spring means, said corrodible link means being adapted to corrode and break under the bias of the spring means after a predetermined time of immersion in seawater, wherein said corrodible link means comprises at least one metallic clip adapted to fit over a portion of the juxtaposed peripheral lips and to hold them together against the bias of said leaf spring.

24. A reusable bait canister suitable for use in cray or crab traps, comprising:

(a) a hollow body member of sufficient capacity to accommodate pieces of fresh bait, wherein the body member is tubular, has a given cross-sectional shape and has a side wall, said side wall having a first series of openings formed therein, said openings being of uniform size and spacing;

(b) an opening formed by the body member, said opening being of sufficient size to permit access to the bait by target crays or crabs;

(c) a closure member supported by the body member for movement moveable between a closed position wherein the closure covers the opening closely enough to prevent access to the bait by small fish and sea lice but loosely enough to permit flow of water into the body member when the canister is submerged, and an open position wherein the opening is uncovered sufficiently to permit access to the bait by the target crays or crabs, wherein the closure member is tubular, has said given cross-sectional shape and has a side wall;

(d) wherein the side wall of the closure member has a second series of openings formed therein, the openings of the second series being of substantially the same size and shape as the openings of said first series;

(e) wherein the body member is slidingly and/or rotationally located within the closure member so that said first and said second series of openings can be brought into registry to allow access by target crabs or crays to bait located within the body member through said openings, and so that said first and second series can be moved out of registry to prevent access to sea lice or the like, and of the target crays or crabs, to bait located within the body member;

(f) spring means operative between the body member and the closure member effective to bias the closure member to the open position; and (g) corrodible link means adapted to secure the closure member in the closed position against the bias of the spring means, said corrodible link means being adapted to corrode and break under the bias of the spring means after a predetermined time of immersion in seawater.

25. A bait canister as recited in claim 24, wherein said given cross-sectional shape is a circle so that both the body member and the closure member are of cylindrical form, and so that, when the body member is located within the closure member, said body member and said closure member have a common longitudinal axis;

wherein the openings of the first series and the openings of the second series extend axially along the body member and along the closure member, respectively; and wherein the openings of the first series can be moved into and out of registry by rotation of the closure member relative to the body member about said common longitudinal axis.

26. A bait canister as recited in claim 25, wherein said spring means is arranged to rotationally bias the body member and the closure member relative to one another so as to tend to bring the openings of the first series into registry with the openings of the second series; and wherein said corrodible link means is arranged to rotationally retain the body member and the closure member against the bias of said spring means so that the openings of the first series are held out of registry with the openings of the second series and access of sea lice and of the target crays or crabs to bait held within the canister is prevented so long as said corrodible link means remains intact.

27. A bait canister as recited in claim 24, wherein said given cross-sectional shape is a rectangle so that both the body member and the closure member are of rectilinear form, and so that, when said body member is located within the closure member, said body member and said closure member have a common longitudinal axis;

wherein the openings of the first series and the openings of the second series extend laterally along at least one side of the body member and laterally along the corresponding side or sides of the closure member, respectively; and wherein the openings of the first and second series can be moved into and out of registry by longitudinal movement of the closure member relative to the body member along said common longitudinal axis.

28. A bait canister as recited in claim 27, wherein said spring means is arranged to longitudinally bias the body member and the closure member relative to one another so as to tend to bring the openings of the first series into registry with the openings of the second series, and said corrodible link means is arranged to retain the body member and the closure member against the bias of said spring means so that the openings of the first series are held out of registry with the openings of the second series and access of sea lice and of the target crays or crabs to bait held within the canister is prevented so long as said corrodible link means remains intact.

29. A reusable bait canister suitable for use in cray or crab traps, comprising:

a hollow body member of sufficient capacity to accommodate pieces of fresh bait, said body member being elongate and having a side portion of cylindrical shape;

an opening formed in the body member, which opening is of sufficient size to permit access to the bait by target crays or crabs;

a closure member supported by the body member for movement moveable between a closed position, in which the closure covers the opening closely enough to prevent access to the bait by small fish and sea lice but loosely enough to permit flow of water into the body member when the canister is submerged, and an open position in which the opening is uncovered sufficiently to permit access to the bait by the target crays or crabs;

spring means operative between the body member and the closure member effective to bias the closure member to the open position; and corrodible link means adapted for connection between the body member and the closure member to secure the closure member in the closed position against the bias of the spring means, said corrodible link means being adapted to corrode and break under the bias of the spring means after a predetermined time of immersion in seawater;

wherein said closure member and said body member are elongate in form and are hingedly connected together about an elongate joint such that the closure member forms a lid for the body member;

wherein a first peripheral lip is formed around the body member and a second peripheral lip is formed around the closure member such that, when the closure member is in the closed position, the first and second peripheral lips are juxtaposed;

wherein said spring means comprises at least one leaf-spring formed integrally with one of the said peripheral lips so as to bias the closure member and the body member apart; and wherein said link means comprises at least one metallic clip adapted to fit over portion of the juxtaposed peripheral lips and to hold them together against the bias of the leaf spring.

* * * * *